United States Patent

Slavik

[15] 3,644,669

[45] Feb. 22, 1972

[54] AUTOMATIC BEAM INTENSITY LIMITER WITH A CURRENT TRANSFORMER COUPLED TO THE ULTOR LEAD

[72] Inventor: William H. Slavik, Oak Lawn, Ill.

[73] Assignee: Motorola, Inc., Franklin Park, Ill.

[22] Filed: May 15, 1970

[21] Appl. No.: 37,507

[52] U.S. Cl. ..........178/7.5 R, 315/22

[51] Int. Cl. ..........H04n 5/44

[58] Field of Search..........178/5.4 R, 7.5 R, 7.5 DC, 5.4 TE, 178/DIG. 4; 315/22; 324/20 CR, 72, 127; 317/31, 51

[56] References Cited

UNITED STATES PATENTS 3,465,095 9/1969 Hansen et al..........178/5.4 R
3,182,260 5/1965 Heaton-Armstrong..........317/51
2,567,744 9/1951 Stanton..........317/51

FOREIGN PATENTS OR APPLICATIONS 49,612 5/1939 France..........324/127

*Primary Examiner*—Robert L. Griffin
*Assistant Examiner*—George G. Stellar
*Attorney*—Mueller & Aichele

[57] ABSTRACT

An automatic beam intensity limiter circuit for a television receiver having a "zero" focus cathode-ray tube arrangement employs a current transformer to sense the pulsating DC current in the lead from the high-voltage rectifier to the cathode-ray tube final anode to produce a control voltage indicative of the beam current intensity since the current in the high-voltage lead is proportional to the beam intensity. This control voltage then is utilized to reduce the direct current voltage in the signal path applying the video signal to the cathode-ray tube to limit the beam intensity to a predetermined level.

3 Claims, 1 Drawing Figure

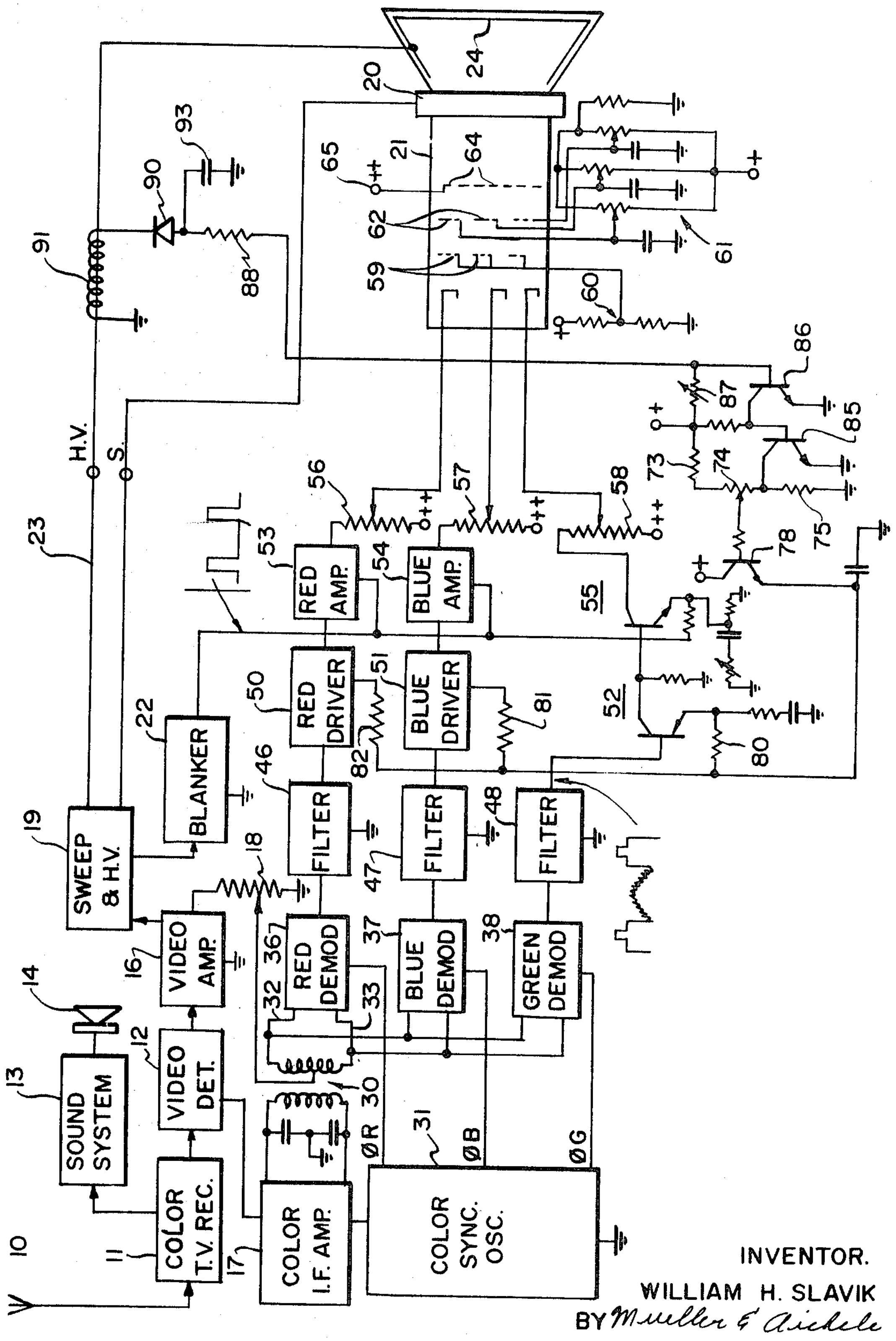
INVENTOR.
WILLIAM H. SLAVIK
BY Mueller & Aichele
ATTORNEYS.

AUTOMATIC BEAM INTENSITY LIMITER WITH A CURRENT TRANSFORMER COUPLED TO THE ULTOR LEAD

BACKGROUND OF THE INVENTION

In present television receivers, a detector circuit is used to convert an incoming television signal into a video signal which then is amplified, processed, and coupled to the cathode ray tube for reconversion into an image. The video signal includes synchronizing pulses for deflection purposes and video information interposed between the synchronizing pulses. In accordance with the usual mode of transmission, the synchronizing pulses are maintained at a fixed reference voltage commonly referred to as "black level" which is independent of picture content. In order that the shading of the image accurately corresponds to the transmitted signal, the black level at the cathode ray tube should be fixed by DC coupling the detector circuit to the cathode ray tube.

Most monochrome television sets have substantially less than 100 percent DC coupling for a variety of reasons, one of which arises from the fact that the transmitted signals do not have the same black level from station to station. The fact that the DC coupling is reduced does not deteriorate the black and white pictures significantly, because the average viewer cannot detect the difference between true black and grey-black or, on the other hand, between true white and grey-white.

In color television receivers, however, different considerations are present because the saturation and hue of the colors are much more noticeably affected by deviations from a constant black level. As a result, it has been proposed to provide a maximum DC coupling between the detector circuit and the cathode ray tube to provide a maximum of authenticity of the reproduced image. In such systems however, it is possible with certain picture content and with some brightness settings to cause the average direct current component of the video signal at the cathode ray tube to be of sufficient amplitude to increase the beam intensity beyond a safe value. Such an increase may significantly reduce the high voltage which is supplied to the cathode ray tube final anode and adversely affect the image reproduction. In addition, other parts of the receiver including the cathode ray tube may be subjected to damage. Thus, it is desirable to eliminate such adverse effects; but since the picture highlights are conveyed by instantaneous high beam intensities, only the average beam intensity should be affected.

Systems have been developed for sets in which the focus voltage is obtained from a voltage divider or resistor string coupled with the high voltage circuit for the cathode ray tube. Deviations in this focus voltage are indicative of changes in the beam current so that a portion of the focus voltage has been used to produce a control voltage indicative of the average beam current for reducing the drive to the cathode ray tube whenever the average beam intensity exceeds a predetermined amount. In television receivers using a "zero" focus for the cathode ray tube, that is receivers in which the focus voltage is not derived from the high-voltage circuit of the television receiver but is supplied from the B+ supply, there is no voltage readily available for use that is proportional to the beam current intensity. A resistive voltage divider could be coupled to the high voltage lead for the final anode of the cathode ray tube in such a receiver could be used to obtain the control voltage; but because of the extremely high voltages involved (on the order of 30 kilovolts), the cost of such a resistive voltage divider is relatively high. Thus, it is desirable to provide some other method for deriving a control voltage indicative of the average beam current intensity for the purpose of reducing the drive to the cathode ray tube when the beam current exceeds a predetermined value, above which the beam intensity is considered unsafe or is considered to subject the receiver to the possibility of damage.

SUMMARY OF THE INVENTION

Accordingly, it is an object of this invention to provide an improved control system for a television receiver responsive to changes in the high voltage therein for changing an operating characteristic of the receiver.

It is another object of this invention to provide an improved control circuit for maintaining the average beam intensity in a cathode ray tube at or below a safe value.

It is an additional object of this invention to use a current transformer to sense the pulsating DC current in the high voltage lead of a cathode ray tube to produce a control voltage indicative of the average beam current intensity in the cathode ray tube.

It is yet another object of this invention to utilize a current transformer to sense the pulsating current in the high-voltage lead for a cathode ray tube of a television receiver to control a threshold circuit which operates to limit the drive to the cathode ray tube when the average beam intensity exceeds a predetermined level.

In accordance with this invention, a television receiver includes an automatic beam limiter system having a sensing means including a current transformer coupled to the high voltage circuit of the receiver for deriving a control voltage indicative of the average beam intensity, with means responsive to a predetermined control voltage for reducing the average beam current intensity in the television receiver.

BRIEF DESCRIPTION OF THE DRAWING

The sole FIGURE of the drawing is a schematic circuit diagram, partially in block form, of a preferred embodiment of the invention.

DETAILED DESCRIPTION

Referring now to the drawing, there is shown a color television receiver 11 coupled to a suitable antenna 10 for receiving a composite signal and for selecting, amplifying and converting the radio frequency signal to an IF frequency for application to a video detector 12. The color television receiver 11 also is coupled to a sound system 13, which demodulates and amplifies the usual 4.5 megahertz sound subcarrier for reproduction by a speaker 14 as the audio signal of the received composite signal supplied by the antenna 10 to the receiver 11.

The video detector 12 is coupled to a video amplifier 16 and to a color IF amplifier 17, which are used to process the brightness and modulated chroma signal components of the received composite signal respectively. The video amplifier 16 supplies signals to a sweep and high voltage circuit 19 which has an output connected to a deflection yoke 20 located on the neck of a three-gun color cathode ray tube 21. The sweep and high-voltage circuit 19 also provides a high voltage over a lead 23 to the final anode 24 of the cathode ray tube 21. This voltage is on the order of 30 kilovolts.

In the color IF amplifier 17, there is a bandpass filter network for selecting the color subcarrier at 3.58 megahertz and its associated sidebands, and the amplifier 17 includes a gain or color intensity control to furnish a selected amplitude of the chroma subcarrier signal at opposite phases with respect to ground to the primary winding of an output transformer 30.

The IF amplifier 17 also is further coupled to a color synchronizing oscillator 31 which selects the burst signals appearing on the "back porch" of the horizontal synchronizing pulses in order to develop a color reference signal of 3.58 megahertz at three different phases for synchronous demodulation of the chroma signals. The three outputs of the oscillator 31 are identified as $\phi$R, $\phi$B, and $\phi$G to designate the phases of reference signals required for demodulating the red, blue and green colors of the modulated chroma signal components respectively.

The output of the video amplifier 16 also is supplied to a contrast control potentiometer 18, the tap of which is connected to a center-tap of the secondary winding of the transformer 30. The luminance or brightness signal obtained from the contrast potentiometer 18 may extend in frequency up to or into the chroma subcarrier sideband.

The secondary winding of the transformer 30 has first and second output leads 32 and 33, with both of these leads carrying the same brightness component with respect to ground, since this component is supplied to the center tap of the secondary winding of the transformer 30. The lead 32 carries the modulated chroma subcarrier one phase, while the lead 33 carries the modulated chroma subcarrier of the opposite phase. These modulated chroma subcarriers are oppositely phased with respect to ground and are phase modulated to represent hue and are amplitude modulated to represent saturation. The leads 32 and 33 are coupled to three direct color signal demodulator circuits 36, 37 and 38. In addition the red, blue and green phase reference signals from the output of the color sync oscillator 31 are applied to the demodulators 36, 37 and 38, respectively, in order to provide direct demodulation of the signals applied to the inputs of these demodulators.

The outputs of the demodulators 36, 37 and 38 are supplied through associated filters 46, 47 and 48 which are provided to trap the 3.58 megahertz reference signal and pass the desired red, blue and green video output signals to three driver amplifier circuits 50, 51 and 52, respectively. Three final or output amplifier circuits 53, 54 and 55 are driven by the outputs of the driver circuits and the outputs of the amplifier circuits 53, 54 and 55 are coupled through variable resistors 56, 57 and 58 to corresponding cathodes of the three-beam cathode ray tube 21. Associated grids of these cathodes are coupled to a suitable bias source in the form of a voltage divider 60. A plurality of controls 61 also are coupled to a source of B+ to independently adjust the potentials on the screen electrodes 62, commonly referred to as the G2 electrodes, to compensate for differences in the characteristics of the three electron guns of the cathode ray tube 21. In addition, the focus electrode 64 is coupled to the B-boost voltage of the television receiver applied at a terminal 65. The cathode ray tube 21 then operates in accordance with well known shadow mask principles to reproduce a monochrome or full color image in accordance with the video drive signals applied to it.

In the foregoing description, the red and blue drivers 50 and 51 and the output amplifiers 53 and 54 have been shown in block form, with the green driver 52 and the green output amplifier 55 being illustrated as including PNP and NPN transistors, respectively, and being shown in detail. The drivers 50 and 51 are similar to the driver 52, and the amplifiers 53 and 54 are similar to the amplifier 55. It may be seen from the manner in which the amplifiers 52 and 55 are coupled to the cathodes of the cathode ray tube 21 that DC coupling is employed.

As stated previously, when this type of coupling is used, it is possible to supply video signals to the cathodes of the cathode ray tube 21 which are sufficient to cause the total average cathode ray beam current or beam intensity to exceed a predetermined value, above which a number of undesirable effects occur. One such effect is that the load presented to the high voltage system increases, resulting in a drop in the high voltage applied to the cathode ray tube final anode 24 from its 30 kilovolt nominal value, thereby degrading the image. In addition, since the signal which is rectified to produce the high voltage is supplied from the horizontal deflection system in the sweep and high voltage circuit 19, increased loading of the high-voltage portion of the circuit consumes a significant portion of the deflection power. This deteriorates the horizontal scan; and portions of the receiver including the cathode ray tube 21, the high voltage rectifier in the sweep circuit 19, and amplifying devices in the horizontal deflection system forming a part of the sweep circuit 19 may be damaged by excessive currents.

Thus, it is desirable to prevent the average beam currents, or beam intensities in the cathode ray tube 21 from exceeding a level beyond which safe operation of the system is not present. This protection is accomplished in conjunction with an automatic brightness limiting circuit which provides the operating potential to the emitters of the transistors in the red, blue and green driver circuits 50, 51 and 52. The brightness control voltage is supplied by a voltage divider connected between a pair of voltage supply terminals connected to the B+ source and ground potential, respectively. The divider consists of a resistor 73, potentiometer 74, and a third resistor 75 shunted by the collector-emitter path of a normally nonconductive NPN transistor 85. The movable arm of the potentiometer 74 constitutes the manual brightness control or adjustment and is coupled to the base of an NPN emitter follower transistor 78, the emitter of which is coupled through three resistors 80, 81 and 82 to respective ones of the emitters of the driver amplifiers 52, 51 and 50. The collector of the transistor 78 is coupled to a source of B+ potential.

Thus, under normal conditions of operation, the output potential on the emitter of the transistor 78 is constant and is established at a value selected by the setting of the potentiometer 74. This condition of operation remains as long as the beam intensity is below a predetermined level (the "safe" level); and the output potential coupled through the resistors 80, 81 and 82 is a constant DC operating voltage for the driver transistors, such as the PNP transistor shown in the amplifier circuit 52. Since the collector of the transistor in the amplifier circuit 52 is DC coupled to the base of the NPN transistor in the output amplifier stage 55, and since the operating voltage of the amplifier 52 is constant, the black level remains fixed at the level determined by the setting of the potentiometer 74. As a result, the average DC component at the cathode ray tube 21 is permitted to freely vary with the video content and with changes in brightness and contrast.

To provide protection against increases in the average beam intensity exceeding a safe level, the transistor 85 is connected with the collector emitter path thereof in shunt across the resistor 75. The emitter of the transistor 85 is connected to ground and the collector is connected to the junction between the potentiometer 74 and the resistor 75. The base of the transistor 85 is driven by the collector of an NPN control transistor 86, the base of which is coupled to a voltage divider connected between the B+ source and ground and which includes a variable resistor 87, a resistor 88, a diode 90, and the secondary winding of a current transformer 91. The primary winding of the transformer 91 is the lead 23. The junction between the resistors 87 and 88 is connected to the base of the transistor 86 and provides a DC bias for controlling the conduction of the transistor 86. Between the junction of the diode 90 and the resistor 88, a storage capacitor 93 is connected to ground.

Under normal conditions of operation of the television receiver, with the beam current below the value considered unsafe, the parameters of the voltage divider 87, 88, 90 and the secondary winding 91 are such that the current pulses carried on the lead 23 are relatively low and operate in conjunction with the diode 90 to allow the capacitor 93 to charge to a relatively high value. This relatively high charge on the capacitor 93 results in an increase in the voltage applied to the base of the transistor 86 at the junction of the variable resistor 87 and the resistor 88 to drive the transistor 86 into saturation, so that it operates to bias the transistor 85 to cut off. As a consequence, the brightness level or the DC operating supply applied by the transistor 78 to the emitter of the transistor in the driver amplifier circuits 50, 51 and 52 is established solely by the setting of the potentiometer 74.

As the beam intensity increases, however, the current pulses applied over the lead 23 to the final anode 24 of the cathode ray tube 21 increase in amplitude. These pulses are rectified by the diode 90 to discharge the capacitor 93; so that a lower average charge is present on the capacitor 93, which operates to integrate or filter out the fluctuations of the pulses induced in the secondary winding 91. When the average beam intensity increases to the predetermined level above which degradation of performance or damage to the receiver could result, the average charge present on the capacitor 93 and applied to the junction of the resistor 88 and the diode 90 is sufficiently low to reduce the potential at the junction of the resistors 87 and 88 to a point where the transistor 86 no longer is biased into saturation. As the transistor 86 becomes less conductive, it operates in effect to increase the conduction of the transistor 85, effectively decreasing the impedance between the junction of the potentiometer 74 with the resistor 75 and ground. This, in turn, results in a lowering of the bias potential applied to the base of the transistor 78 for any given setting of the potentiometer 74. Thus, the conductivity of the transistor 78 is reduced, resulting in reduced voltage applied to the emitters of the transistors in the driver amplifiers 50, 51 and 52.

Further tendencies for the beam current intensity to increase even more result in the amplitude of the direct current pulses on the lead 23 being further increased, with results in corresponding average decrease on the charge present across the capacitor 93 to further reduce the forward bias of the transistor 86 resulting in a further reduction in the bias voltage applied to the base of the transistor 78. Thus, the DC operating potential for the driver amplifiers 50, 51 and 52 is reduced still further.

Once the average beam current drops below the value selected to pull the transistor 86 out of saturation, the transistor 86 once again is driven to saturation by the forward biasing potential on its base, and the circuit operates in the manner described previously.

It should be noted that the output potential on the emitter of the transistor 78 only varies the operating voltage for the transistors in the drive circuits 50, 51 and 52. This causes no change in the bias of these transistors; so that the gain of the transistors in these amplifying stages is not affected and the peak to peak amplitude of this signal, and thus the contrast, does not change. The same is true of the transistors in the output amplifiers 53, 54 and 55, so that the only effect of varying the operating potential is to move the entire signal up or down by moving the black level (and thus the average direct current component) to cause an apparent decrease in DC coupling to the cathode ray tube 21. It would be undesirable to change the peak to peak amplitude because that would unnecessarily change the contrast.

In addition it should be noted that sharp transient high-voltage spikes indicative of desirable details in the image are not eliminated, since such spikes cause only a negligable change in the average beam intensity as measured by the charge on the capacitor 93. For example, if a dim scene is being transmitted and this scene includes a bright object, there will be a high-voltage spike in the beam intensity waveform which may exceed the level considered safe for an average beam intensity but which is desirable for reproduction of the fine details in the image. The circuit shown in FIG. 1 does not eliminate such necessary and desirable signal components.

The diode 90 is employed to prevent the pulses caused by collapse of flux in the winding 1 from being applied to the capacitor 93. Such pulses would, in effect, partially recharge the capacitor 93 after the discharge operation caused by the buildup of flux in the winding 91 for a DC current pulse appearing on the lead 23. The diode 90 operates to rectify the pulses on the winding 91 to unidirectional pulses utilized to discharge the capacitor 93 to varying levels indicative of the average beam current intensity, as measured by the changes in the amplitude of the pulses appearing on the lead 23.

The illustrated circuit utilizing direct demodulation of the luminance and chroma components of the composite signal may be considered as merely illustrative, and other known methods of providing the signals for driving the cathode ray tube 21 may be employed in conjunction with the brightness control circuit shown and described. Although the invention has been described as being part of a color television receiver, it may be appreciated that the beam limiter system also is useful in a DC coupled black and white set.

Although the brightness control generally is physically limited to sets having a portion or all of the video AC coupled to the cathode ray tube 21, so that the possibility of an excessive beam intensity is reduced, there maybe certain applications where such physical limiting is impractical. In such cases, the beam limiter system maybe employed even in a AC coupled set. It should be noted that such physical limiting of the brightness control in a DC coupled set is undesirable, because it would severely reduce detail in order to maintain the average beam intensity below a safe value, whereas in an AC coupled receiver, changes in picture content do not change the average, and therefore no loss in detail results in limiting very closely to the safe value.

I claim:

1. In a television receiver including a video detector and an amplifier system coupled to a cathode ray tube for translating a video signal thereto, the cathode ray tube having a final anode supplied with high voltage over a high voltage lead and the amplifier system including a direct current signal path coupled to the cathode ray tube and having an amplifier transistor with base, emitter, and collector electrodes, the collector-emitter circuit of the amplifier transistor being direct current coupled to the cathode ray tube with signals obtained from the detector applied to the base thereof, the average direct current component of the video signal at the cathode ray tube subject to causing the average intensity of the cathode ray beam to exceed a predetermined level, an automatic beam limiter system including in combination:

first and second voltage supply terminals;

a second transistor with base, emitter, and collector electrodes the collector-emitter path of the second transistor being connected in series with a source of operating potential and the collector-emitter path of said amplifier transistor;

first voltage divider means;

a current transformer, the primary winding of which comprises said high voltage lead and having a secondary winding, one end of which is coupled with said second voltage supply terminal and the other end of which is connected in series with said first voltage divider means to said first voltage supply terminal;

charge storage means coupled to said first voltage divider means for storing a charge indicative of the average current in said high voltage lead;

second voltage divider means connected between said first and second voltage supply terminals;

means coupling the base of said second transistor with said second voltage divider means to bias said second transistor into predetermined conductivity;

a third transistor, having collector, base, and emitter electrodes, the collector-emitter path of which is coupled with said second voltage divider means, the base of said third transistor being coupled with a point on said first voltage divider means having a voltage varying in accordance with the charge stored by said charge storing means, the conductivity of said third transistor changing in response to a predetermined charge stored by said charge storing means indicative of average beam currents in excess of a predetermined level to thereby change the bias supplied to the base of said second transistor by said second voltage divider means in a manner to reduce the conductivity thereof.

2. The combination according to claim 1 wherein said third transistor is normally nonconductive and the collector-emitter path of said third transistor is coupled in parallel with a portion of said second voltage divider means, and said predetermined stored charge indicative of average beam currents in excess of said predetermined level renders said third transistor conductive to shunt said portion of said second voltage divider means to thereby change the bias supplied to the base of said second transistor in a manner reducing the conductivity thereof.

3. The combination according to claim 2 wherein said first voltage divider coupled with the base of the third transistor includes a unidirectional conductive means coupled in series therewith to one end of the secondary winding of the current transformer, the other end of which is coupled with said second supply terminal and wherein the charge storage means includes capacitor means coupled between said second supply terminal and a junction formed by the unidirectional conductive means and the remainder of said first voltage divider means, current pulses induced in the secondary winding of the current transformer by the current pulses appearing on the high voltage lead reducing the charge on the charge storage means below a predetermined level for average beam intensities above said predetermined level, which in turn increases the forward biasing voltage on the base of the third transistor to render it conductive in accordance with the magnitude of the stored charge.

* * * * *